US012749915B2

(12) United States Patent
Zhao et al.

(10) Patent No.: US 12,749,915 B2
(45) Date of Patent: Sep. 29, 2026

(54) POWER CONVERTER AND CONTROL METHOD THEREFOR, UNINTERRUPTIBLE POWER SUPPLY, AND POWER SUPPLY SYSTEM

(71) Applicant: Huawei Digital Power Technologies Co., Ltd., Shenzhen (CN)

(72) Inventors: Jun Zhao, Dongguan (CN); Chengliang Zhang, Dongguan (CN); Zhu Mao, Shenzhen (CN); Yaowei Hu, Shenzhen (CN); Zhixiang Hu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/621,415

(22) Filed: Mar. 29, 2024

(65) Prior Publication Data

US 2024/0333026 A1 Oct. 3, 2024

(30) Foreign Application Priority Data

Mar. 31, 2023 (CN) ......................... 202310364274.8
Aug. 3, 2023 (CN) ......................... 202310972731.1

(51) Int. Cl.

| | |
|---|---|
| ***H02J 9/06*** | (2006.01) |
| ***H02J 3/32*** | (2006.01) |
| ***H02J 3/38*** | (2006.01) |
| ***H02M 1/00*** | (2006.01) |
| *H02J 101/24* | (2026.01) |

(52) U.S. Cl.

CPC ................ *H02J 9/062* (2013.01); *H02J 3/32* (2013.01); *H02J 3/38* (2013.01); *H02M 1/0067* (2021.05); *H02J 2101/25* (2026.01)

(58) Field of Classification Search

CPC ...... H02J 9/062; H02J 3/32; H02J 3/38; H02J 2300/26; H02J 3/381; H02M 1/0067; H02M 1/007; Y02E 10/56

See application file for complete search history.

(56) References Cited

U.S. PATENT DOCUMENTS

| | | | | |
|---|---|---|---|---|
| RE43,572 E * | 8/2012 | West | .................. | H02M 7/4807 307/64 |
| 2012/0092903 A1 * | 4/2012 | Nania | ....................... | H02J 7/35 363/34 |
| 2013/0201733 A1 * | 8/2013 | Divan | ..................... | H02M 5/00 363/39 |

FOREIGN PATENT DOCUMENTS

CN 206743122 U * 12/2017

* cited by examiner

*Primary Examiner* — Daniel Cavallari
(74) *Attorney, Agent, or Firm* — Maier & Maier, PLLC

(57) ABSTRACT

A micro inverter and a control method therefor, an uninterruptible power supply, and a power supply system. The micro inverter includes a primary-side winding, a first secondary-side winding, a second secondary-side winding, a first power conversion, a second power conversion circuit and an energy storage buffer circuit. When the micro inverter generates double frequency ripple power, a controller controls the energy storage buffer circuit to perform charging in a first time period, so that energy from the first power conversion circuit is absorbed by using the transformer to perform energy buffering, and controls the energy storage buffer circuit to perform discharging in a second time period, so that energy is transferred to the second power conversion circuit by using the transformer. According to the embodiments, a volume of the micro inverter can be reduced, costs are reduced, and reliability of a power converter is improved.

15 Claims, 10 Drawing Sheets

POWER CONVERTER AND CONTROL METHOD THEREFOR, UNINTERRUPTIBLE POWER SUPPLY, AND POWER SUPPLY SYSTEM

CROSS-REFERENCE TO RELATED APPLICATION

This application claims priority to Chinese Patent Application No. 202310972731.1, filed on Aug. 3, 2023 and Chinese Patent Application No. 202310364274.8, filed on Mar. 31, 2023. Both of the aforementioned applications are hereby incorporated by reference in their entireties.

TECHNICAL FIELD

The embodiments relate to the field of power electronics technologies, and to a power converter and a control method therefor, an uninterruptible power supply, and a power supply system.

BACKGROUND

Currently, a power converter is configured to supply power to a load after performing power conversion on a voltage of an input power supply. In this power supply process, an imbalance may occur between instantaneous power of the input power supply and instantaneous power of the load. As a result, the power converter generates double frequency ripple power, and a service life of the input power supply is shortened. To prolong the service life of the input power supply, a large-capacity electrolytic capacitor is added to the power converter. The large-capacity electrolytic capacitor is configured to decouple the foregoing double frequency ripple power, to prolong the service life of the input power supply. However, when a large-capacity electrolytic capacitor is used, a volume of the power converter is increased, costs are increased, and reliability of the power converter is reduced.

SUMMARY

The embodiments provide a power converter and a control method therefor, an uninterruptible power supply, and a power supply system, to avoid using a large-capacity electrolytic capacitor. Therefore, a volume of the power converter is reduced, costs are reduced, reliability of the power converter is improved, and applicability is high.

According to a first aspect, the embodiments provide a power converter. The power converter includes a first power conversion circuit, a transformer, a second power conversion circuit, an energy storage buffer circuit, and a controller. The transformer includes a primary-side winding, a first secondary-side winding, and a second secondary-side winding. An input of the first power conversion circuit may be configured to connect to a power supply, and an output of the first power conversion circuit may be connected to the primary-side winding. An input of the second power conversion circuit may be connected to the first secondary-side winding, and an output of the second power conversion circuit may be configured to connect to a load. The energy storage buffer circuit may be connected to the second secondary-side winding. When the power converter generates double frequency ripple power, the controller is configured to control the energy storage buffer circuit to perform charging in a first time period, so that energy from the first power conversion circuit is absorbed by using the transformer to perform energy buffering, to store energy other than energy flowing to the load into the energy storage buffer circuit. The controller is configured to control the energy storage buffer circuit to perform discharging in a second time period, so that energy is transferred to the second power conversion circuit by using the transformer, to release energy stored in the energy storage buffer circuit to the load by using the second power conversion circuit. The second time period is after the first time period. The first time period and the second time period are different working time periods of the energy storage buffer circuit, the first time period is a charging time period of the energy storage buffer circuit, and the second time period is a discharging time period of the energy storage buffer circuit. In this implementation, the energy storage buffer circuit can be controlled to perform charging or discharging in different working time periods, to decouple the double frequency ripple power generated by the power converter. This prolongs a service life of the power supply. In addition, the use of a large-capacity electrolytic capacitor can also be avoided. Therefore, a volume of the power converter is reduced, costs are reduced, reliability of the power converter is improved, and applicability is high.

With reference to the first aspect, in a first possible implementation, in the first time period, input power of the power converter is greater than output power, where the input power and the output power are instantaneous power. The controller is configured to control the energy storage buffer circuit to perform charging, so that the energy storage buffer circuit absorbs the energy from the first power conversion circuit by using the transformer to perform energy buffering, to store the energy other than the energy flowing to the load into the energy storage buffer circuit. In the second time period, the input power of the power converter is less than the output power. The controller is configured to control the energy storage buffer circuit to perform discharging, so that the energy storage buffer circuit transfers the energy to the second power conversion circuit by using the transformer, to release the energy stored in the energy storage buffer circuit to the load by using the second power conversion circuit. In this implementation, in different working time periods, the first power conversion circuit can be controlled to charge the energy storage buffer circuit or the energy storage buffer circuit can be controlled to perform discharging on the second power conversion circuit, to decouple the double frequency ripple power generated by the power converter. This prolongs the service life of the power supply.

With reference to the first possible implementation of the first aspect, in a second possible implementation, the energy storage buffer circuit includes a switch unit and an energy storage element, and the second secondary-side winding may be connected to the energy storage element by using the switch unit. In the first time period, the input power of the power converter is greater than the output power. The controller is configured to control the switch unit to be in forward conduction, so that the energy storage element absorbs the energy from the first power conversion circuit by using the transformer to perform energy buffering, to store the energy other than the energy flowing to the load into the energy storage element. In the second time period, the input power of the power converter is less than the output power. The controller is configured to control the switch unit to be in reverse conduction, so that the energy storage element transfers the energy to the second power conversion circuit by using the transformer, to release the energy stored in the energy storage element to the load by using the second power conversion circuit. In this implementation, charging and discharging processes of the energy storage element may be implemented by controlling an on/off state of the switch unit, to decouple the double frequency ripple power generated by the power converter. This prolongs the service life of the power supply.

With reference to the second possible implementation of the first aspect, in a third possible implementation, when the switch unit includes a first switch and a second switch. The controller is configured to: control the first switch to remain in an on state or an off state, and control the second switch to be on or off, so that the energy storage element absorbs the energy from the first power conversion circuit by using the transformer to perform energy buffering, to store the energy other than the energy flowing to the load into the energy storage element in each on-off cycle of the second switch. The controller is configured to: control the second switch to remain in an on state or an off state, and control the first switch to be on or off, so that the energy storage element transfers the energy to the second power conversion circuit by using the transformer, to release the energy stored in the energy storage element to the load by using the second power conversion circuit in each on-off cycle of the first switch. In this implementation, the charging and discharging processes of the energy storage element may be implemented by controlling the on/off state of the first switch and the on/off state of the second switch, to decouple the double frequency ripple power generated by the power converter. This prolongs the service life of the power supply.

With reference to any one of the first aspect to the third possible implementation of the first aspect, in a fourth possible implementation, the power converter further includes a first impedance element. The output of the first power conversion circuit is connected in series or in parallel to the first impedance element and then connected to the primary-side winding, to form a resonant circuit. This reduces a switching loss of the power converter, and improves conversion efficiency and a gain of the power converter.

With reference to any one of the first aspect to the fourth possible implementation of the first aspect, in a fifth possible implementation, the power converter further includes a second impedance element. The first secondary-side winding is connected in series or in parallel to the second impedance element and then connected to the input of the second power conversion circuit to form a resonant circuit. This reduces the switching loss of the power converter, and improves the conversion efficiency and the gain of the power converter.

With reference to any one of the first aspect to the fifth possible implementation of the first aspect, in a sixth possible implementation, when the power converter is a direct current (DC)/alternating current (AC) converter, the first power conversion circuit is a DC/AC conversion circuit, and the second power conversion circuit is an AC/AC conversion circuit.

With reference to any one of the first aspect to the fifth possible implementation of the first aspect, in a seventh possible implementation, when the power converter is an AC/DC converter, the first power conversion circuit is an AC/AC conversion circuit, and the second power conversion circuit is an AC/DC conversion circuit.

With reference to the third possible implementation of the first aspect, in an eighth possible implementation, the first switch and the second switch may be reversely connected in series to form a bidirectional switch. This improves efficiency and power density of the power converter. For example, a dotted terminal of the second secondary-side winding may be connected to one end of the energy storage element, a non-dotted terminal of the second secondary-side winding may be connected to a drain (D) of the first switch, a source (S) of the first switch may be connected to a source of the second switch, and a drain of the second switch may be connected to the other end of the energy storage element. Because the source of the first switch is connected to the source of the second switch, the first switch and the second switch may be two switches of a common-source structure. In this case, a drive circuit corresponding to the first switch and a drive circuit corresponding to the second switch may be powered by a same drive power supply, so that one drive power supply may be saved. This reduces circuit costs of the power converter.

Alternatively, a dotted terminal of the second secondary-side winding may be connected to one end of the energy storage element, a non-dotted terminal of the second secondary-side winding may be connected to a source of the first switch, a drain of the first switch may be connected to a drain of the second switch, and a source of the second switch may be connected to the other end of the energy storage element. Because the drain of the first switch is connected to the drain of the second switch, the first switch and the second switch may be two switches of a common-drain structure. This reduces an on resistance of a switch and improves efficiency of the switch. It may be understood that a specific connection manner of the first switch and the second switch may be determined based on an actual application scenario, and is not limited herein.

With reference to the third possible implementation of the first aspect, in a ninth possible implementation, a dotted terminal of the second secondary-side winding is connected to one end of the energy storage element by using the first switch, and a non-dotted terminal of the second secondary-side winding is connected to the other end of the energy storage element by using the second switch.

According to a second aspect, the embodiments provide a control method for a power converter. In the method, a controller may control an energy storage buffer circuit to perform charging in a first time period, so that energy from a first power conversion circuit is absorbed by using a transformer to perform energy buffering, to store energy other than energy flowing to a load into the energy storage buffer circuit. The transformer includes a primary-side winding, a first secondary-side winding, and a second secondary-side winding, an input of the first power conversion circuit is configured to connect to a power supply, an output of the first power conversion circuit is connected to the primary-side winding, and the energy storage buffer circuit is connected to the second secondary-side winding. Further, the controller may control the energy storage buffer circuit to perform discharging in a second time period, so that energy is transferred to a second power conversion circuit by using the transformer, to release energy stored in the energy storage buffer circuit to the load by using the second power conversion circuit. An input of the second power conversion circuit is connected to the first secondary-side winding, an output of the second power conversion circuit is configured to connect to the load, and the second time period is after the first time period. The first time period and the second time period are different working time periods of the energy storage buffer circuit, the first time period is a charging time period of the energy storage buffer circuit, and the second time period is a discharging time period of the energy storage buffer circuit. In this implementation, the controller may control the energy storage buffer circuit to perform charging or discharging in different working time periods, to decouple the double frequency ripple power generated by the power converter. This prolongs a service life of the power supply.

With reference to the second aspect, in a first possible implementation, in the first time period, input power of the power converter is greater than output power, and the controller may control the energy storage buffer circuit to perform charging, so that the energy storage buffer circuit absorbs the energy from the first power conversion circuit by using the transformer to perform energy buffering, to store the energy other than the energy flowing to the load into the energy storage buffer circuit. In the second time period, the input power of the power converter is less than the output power, and the controller may control the energy storage buffer circuit to perform discharging, so that the energy storage buffer circuit transfers the energy to the second power conversion circuit by using the transformer, to release the energy stored in the energy storage buffer circuit to the load by using the second power conversion circuit. In this implementation, in different working time periods, the first power conversion circuit can be controlled to charge the energy storage buffer circuit or the energy storage buffer circuit can be controlled to perform discharging on the second power conversion circuit, to decouple the double frequency ripple power generated by the power converter. This prolongs the service life of the power supply.

With reference to the first possible implementation of the second aspect, in a second possible implementation, the energy storage buffer circuit includes a switch unit and an energy storage element, and the second secondary-side winding may be connected to the energy storage element by using the switch unit. In the first time period, the input power of the power converter is greater than the output power, and the controller may control the switch unit to be in forward conduction, so that the energy storage element absorbs the energy from the first power conversion circuit by using the transformer to perform energy buffering, to store the energy other than the energy flowing to the load into the energy storage element. In the second time period, the input power of the power converter is less than the output power, and the controller may control the switch unit to be in reverse conduction, so that the energy storage buffer circuit transfers the energy to the second power conversion circuit by using the transformer, to release the energy stored in the energy storage buffer circuit to the load by using the second power conversion circuit. In this implementation, charging and discharging processes of the energy storage element may be implemented by controlling an on/off state of the switch unit, to decouple the double frequency ripple power generated by the power converter. This prolongs the service life of the power supply.

With reference to the second possible implementation of the second aspect, in a third possible implementation, when the switch unit includes the first switch and the second switch, the controller may control the first switch to remain in an on state or an off state, and control the second switch to be on or off, so that the energy storage element absorbs the energy from the first power conversion circuit by using the transformer to perform energy buffering, to store the energy other than the energy flowing to the load into the energy storage element in each on-off cycle of the second switch. The controller may control the second switch to remain in an on state or an off state, and control the first switch to be on or off, so that the energy storage element transfers the energy to the second power conversion circuit by using the transformer, to release the energy stored in the energy storage element to the load by using the second power conversion circuit in each on-off cycle of the first switch. In this implementation, the charging and discharging processes of the energy storage element may be implemented by controlling the on/off state of the first switch and the on/off state of the second switch, to decouple the double frequency ripple power generated by the power converter. This prolongs the service life of the power supply.

According to a third aspect, the embodiments provide an uninterruptible power supply. The uninterruptible power supply includes at least one power converter provided in any one of the first aspect to the ninth possible implementation of the first aspect, and the power converter includes a first power conversion circuit, a transformer, a second power conversion circuit, and an energy storage buffer circuit. In a first time period, input power of the power converter is greater than output power, and the energy storage buffer circuit is configured to perform charging, to absorb energy from the first power conversion circuit by using the transformer to perform energy buffering, so as to store energy other than energy flowing to a load into the energy storage buffer circuit. In a second time period, the input power of the power converter is less than the output power, and the energy storage buffer circuit is configured to perform discharging, to transfer energy to the second power conversion circuit by using the transformer, so as to release energy stored in the energy storage buffer circuit to the load by using the second power conversion circuit. In this implementation, the energy storage buffer circuit may perform charging and discharging to decouple the double frequency ripple power generated by the power converter. This prolongs the service life of the uninterruptible power supply, and improves power supply efficiency of the uninterruptible power supply, and applicability is high. In addition, because the power converter has a smaller size and lower costs, an overall size of the uninterruptible power supply may be reduced, and costs of the uninterruptible power supply are reduced.

According to a fourth aspect, the embodiments provide a power supply system. The power supply system includes an energy storage module, the power converter according to any one of the first aspect to the ninth possible implementation of the first aspect, and a box-type transformer, where the energy storage module is connected to an input of the power converter, an output of the power converter is connected to an input of the box-type transformer, and an output of the box-type transformer is configured to connect to a load. The power converter includes a first power conversion circuit, a transformer, a second power conversion circuit, and an energy storage buffer circuit. In a first time period, input power of the power converter is greater than output power, and the energy storage buffer circuit is configured to perform charging, to absorb energy from the first power conversion circuit by using the transformer to perform energy buffering, so as to store energy other than energy flowing to the load into the energy storage buffer circuit. In a second time period, the input power of the power converter is less than the output power, and the energy storage buffer circuit is configured to perform discharging, to transfer energy to the second power conversion circuit by using the transformer, so as to release energy stored in the energy storage buffer circuit to the load by using the second power conversion circuit. In this implementation, the energy storage buffer circuit may perform charging and discharging to decouple double frequency ripple power generated by the power converter. This prolongs the service life of the energy storage module, and improves power supply efficiency of the energy storage module, and applicability is high.

With reference to the fourth aspect, in a first possible implementation, in a photovoltaic power supply application scenario, the power supply system further includes a maximum power point tracking (MPPT) combiner box, where an input of the MPPT combiner box is configured to connect to a photovoltaic array, and an output of the MPPT combiner box is connected to the input of the power converter.

In the embodiments, the controller may flexibly control an on/off state of the first switch and an on/off state of the second switch in different working time periods to implement charging and discharging processes of the energy storage element, to decouple the double frequency ripple power generated by the power converter. This prolongs a service life of the power supply. In addition, the use of a large-capacity electrolytic capacitor can also be avoided. Therefore, a volume of the power converter is reduced, costs are reduced, reliability of the power converter is improved, and applicability is higher.

According to a fifth aspect, the embodiments provide a micro inverter. The micro inverter is connected between a photovoltaic module and a power grid or a load, and is configured to convert a direct current to an alternating current. The micro inverter includes a first power conversion circuit, a transformer, a second power conversion circuit, an energy storage buffer circuit, and a controller. The transformer includes a primary-side winding, a first secondary-side winding, and a second secondary-side winding. An input of the first power conversion circuit may be configured to connect to the photovoltaic module, an output of the first power conversion circuit may be connected to the primary-side winding, and the first power conversion circuit may be configured to convert the direct current to a high-frequency alternating current. An input of the second power conversion circuit may be connected to the first secondary-side winding, an output of the second power conversion circuit may be configured to connect to the load, and the second power conversion circuit may be configured to convert a high-frequency alternating current boosted by the transformer to the alternating current adapted to the power grid or the load. The energy storage buffer circuit may be connected to the second secondary-side winding. When the micro inverter generates double frequency ripple power, the controller is configured to control the energy storage buffer circuit to perform charging in a first time period, so that energy from the first power conversion circuit is absorbed by using the transformer to perform energy buffering, to store energy other than energy flowing to the load into the energy storage buffer circuit. The controller is configured to control the energy storage buffer circuit to perform discharging in a second time period, so that energy is transferred to the second power conversion circuit by using the transformer, to release energy stored in the energy storage buffer circuit to the load by using the second power conversion circuit. The second time period is after the first time period. The first time period and the second time period are different working time periods of the energy storage buffer circuit, the first time period is a charging time period of the energy storage buffer circuit, and the second time period is a discharging time period of the energy storage buffer circuit. In this implementation, the energy storage buffer circuit can be controlled to perform charging or discharging in different working time periods, to decouple the double frequency ripple power generated by the micro inverter. This prolongs a service life of a power supply. In addition, the use of a large-capacity electrolytic capacitor can also be avoided. Therefore, a volume of the micro inverter is reduced, costs are reduced, reliability of a power converter is improved, and applicability is high. The micro inverter further has a maximum power point tracking function. The controller may control an input voltage of the first power conversion circuit, to adjust a working voltage of the photovoltaic module connected to the micro inverter, to perform maximum power point tracking on the photovoltaic module.

DETAILED DESCRIPTION OF EMBODIMENTS

A power converter provided in the embodiments is applicable to a plurality of application fields, such as the new energy intelligent micro-grid field, the power transmission and distribution field or the new energy field, the photovoltaic power generation field, the wind power generation field, and the high-power converter field. This may be determined based on an actual application scenario, and is not limited herein. The power converter provided may be adapted to different application scenarios, for example, an energy storage and power supply application scenario, a photovoltaic power supply application scenario, a wind power grid-connected power supply scenario, or another application scenario. The following uses the energy storage and power supply application scenario as an example for description, and details are not described below again.

Figure 1:
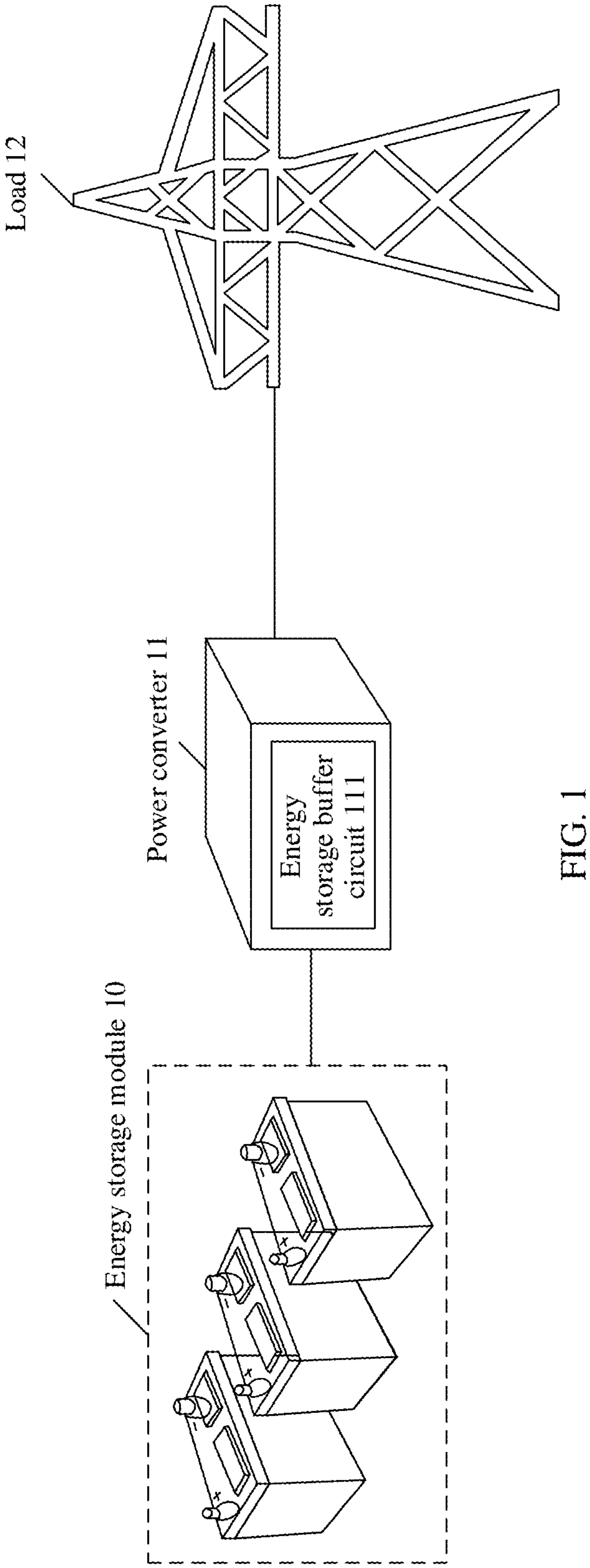
FIG. 1 is a schematic diagram of an application scenario of a power converter.

FIG. 1 is a schematic diagram of an application scenario of a power converter according to the embodiments. As shown in FIG. 1, an energy storage module 10 is connected to an input of a power converter 11, and an output of the power converter 11 is configured to connect to a load 12. For example, the load 12 may be a power grid, a home device, an industrial power consuming device, a commercial power consuming device, or another power consuming device. As shown in FIG. 1, the load 12 is the power grid. The energy storage module 10 includes a plurality of batteries connected in series and parallel, and the power converter 11 is a DC/AC converter. When the energy storage module 10 works normally, the power converter 11 may invert a direct current provided by the energy storage module 10 to an alternating current, and supply power to the load 12 based on the alternating current. In a process in which the power converter 11 inverts the direct current to the alternating current, an imbalance between input power and output power of the power converter 11 may occur. Consequently, the power converter 11 generates double frequency ripple power, to shorten the service life of the energy storage module 10.

An energy storage buffer circuit 111 is added inside the power converter 11 provided in the embodiments. The power converter 11 may control the energy storage buffer circuit 111 to perform charging or discharging in different working time periods, to decouple the double frequency ripple power generated by the power converter 11. This prolongs the service life of the energy storage module 10 and applicability is high. The following describes, by using examples with reference to FIG. 2 to FIG. 9, the power converter, an uninterruptible power supply, a power supply system, and working principles thereof provided in the embodiments.

Figure 2:
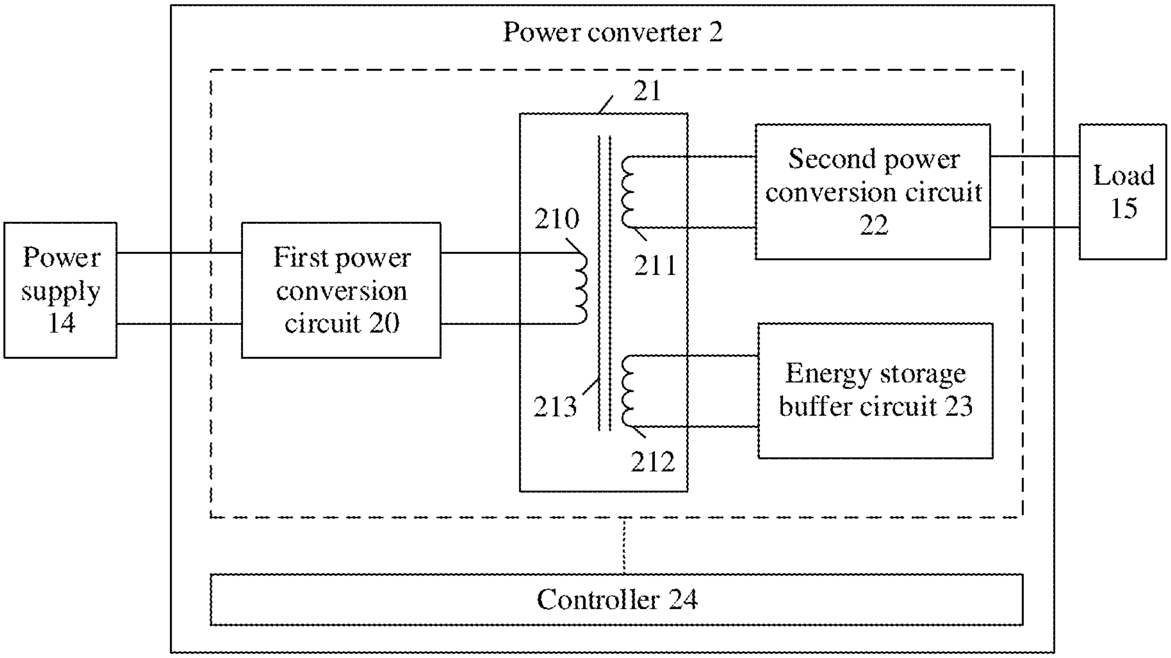
FIG. 2 is a schematic diagram of a structure of a power converter.

FIG. 2 is a schematic diagram of a structure of a power converter according to the embodiments. As shown in FIG. 2, a power converter 2 includes a first power conversion circuit 20, a transformer 21, a second power conversion circuit 22, an energy storage buffer circuit 23, and a controller 24. The transformer 21 includes a primary-side winding 210, a first secondary-side winding 211, and a second secondary-side winding 212. The primary-side winding 210, the first secondary-side winding 211, and the second secondary-side winding 212 are all wound around a magnetic core 213. An input of the first power conversion circuit 20 may be configured to connect to a power supply 14, an output of the first power conversion circuit 20 may be connected to the primary-side winding 210, an input of the second power conversion circuit 22 may be connected to the first secondary-side winding 211, an output of the second power conversion circuit 22 may be configured to connect to a load 15, and the energy storage buffer circuit 23 may be connected to the second secondary-side winding 212.

In an embodiment, when the power converter 2 is a DC/AC converter, the first power conversion circuit 20 may be a DC/AC conversion circuit, and the second power conversion circuit 22 may be an AC/AC conversion circuit. The first power conversion circuit 20 may be one of a forward conversion circuit, a single-ended flyback conversion circuit, a push-pull conversion circuit, a half-bridge conversion circuit, and a full-bridge conversion circuit. The second power conversion circuit 22 may be one of an alternating current voltage regulation circuit, an alternating current power control circuit, and an alternating current-alternating current frequency conversion circuit.

In an embodiment, when the power converter 2 is the DC/AC converter, the power supply 14 may be a direct current power supply, and the load 15 may be an alternating current load. The power supply 14 may be one of a photovoltaic module, an energy storage battery, a direct current power grid, and a direct current charging pile. The load 15 is an AC power consuming device.

In an embodiment, the power converter 2 is a micro inverter, the power supply 14 is a photovoltaic module, and the load 15 is a power grid or a load. The micro inverter may convert a direct current generated by the photovoltaic module to an alternating current required by the power grid or the load. The micro inverter may be directly installed near the photovoltaic module. A power conversion process of the micro inverter occurs on a side far away from a power consumption side, and a conversion voltage of the micro inverter may not exceed a voltage level of a power consumption load of power consumption personnel, which is very safe for the power consumption personnel. The micro inverter also provides an MPPT (maximum power point tracking) function, which can maximize an alternating current power output based on an output characteristic of the photovoltaic module. For example, when an environment condition like a sunshine condition and an ambient temperature changes, the output characteristic of the photovoltaic module changes. The MPPT function may be used to detect the output characteristic of the photovoltaic module in real time, and automatically find a maximum power output point under the condition of the detected output characteristic, so that a power generation system including the micro inverter may have maximum output power. In other words, the MPPT function may enable the power generation system to manage to maintain a maximum power output under any environment condition. For example, the micro inverter may further control an input voltage of the first power conversion circuit by using the controller, to adjust a working voltage of the connected photovoltaic module, so as to perform maximum power point tracking.

When the power converter 2 is the micro inverter, a direct current input by the first power conversion circuit is affected by a quantity of photovoltaic modules connected to the first power conversion circuit, module characteristics of the photovoltaic modules, sunlight, an ambient temperature, and other conditions, and can be more than 10 volts to more than 50 volts. The first power conversion circuit performs inverter conversion on the input direct current to obtain a high-frequency alternating current, where a frequency of the alternating current can be tens of kHz to hundreds of kHz, a peak voltage of the alternating current is the direct current voltage, and an effective voltage of the alternating current is affected by the load connected to the micro inverter. The transformer boosts the high-frequency alternating current, and the second power conversion circuit performs frequency conversion on a boosted high-frequency alternating current, to obtain an alternating current adapted to the power grid or the load connected to the inverter, where a frequency and a voltage of the adapted alternating current are determined by using a characteristic of a power grid and a load in a region in which the micro inverter is installed, the frequency of the adapted alternating current can be 50 Hz or 60 Hz, and the voltage of the adapted alternating current can be 220 V.

In an embodiment, when the power converter 2 is an AC/DC converter, the first power conversion circuit 20 may be an AC/AC conversion circuit, and the second power conversion circuit 22 may be an AC/DC conversion circuit. The first power conversion circuit 20 may be one of an alternating current voltage regulation circuit, an alternating current power control circuit, and an alternating current-alternating current frequency conversion circuit. The second power conversion circuit 22 may be one of a forward conversion circuit, a single-ended flyback conversion circuit, a push-pull conversion circuit, a half-bridge conversion circuit, and a full-bridge conversion circuit.

In an embodiment, when the power converter 2 is the AC/DC converter, the power supply 14 may be an alternating current power supply, and the load 15 may be a direct current load. The power supply 14 may be one of an alternating current power grid, a generator, an alternating current charging pile, and an uninterruptible power supply (UPS). The load 15 is a DC power consuming device.

In an embodiment, the transformer 21 may be an isolation transformer. The transformer 21 includes three ports, and the three ports include an input port on one side of the primary-side winding 210, an output port on one side of the first secondary-side winding 211, and an output port on one side of the second secondary-side winding 212. Therefore, the transformer 21 may also be referred to as a three-port transformer or a three-winding transformer.

In an embodiment, each secondary-side winding in the first secondary-side winding 211 and the second secondary-side winding 212 may be a boost winding or a buck winding. When each secondary-side winding is the boost winding, a quantity of turns of each secondary-side winding is greater than a quantity of turns of the primary-side winding 210. When each secondary-side winding is the buck winding, a quantity of turns of each secondary-side winding is less than a quantity of turns of the primary-side winding 210.

In an embodiment, the controller 24 may be one of a micro controller unit (MCU), a central processing unit (CPU), a general-purpose processor, a digital signal processor (DSP), an application-specific integrated circuit (ASIC), a field-programmable gate array (FPGA), or another programmable logic device, a discrete gate or transistor logic device, and a discrete hardware component.

In an embodiment, the controller 24 performs wireless communication or wired communication with the first power conversion circuit 20, the second power conversion circuit 22, and the energy storage buffer circuit 23, to control the first power conversion circuit 20, the second power conversion circuit 22, and the energy storage buffer circuit 23 to work.

In an embodiment, when the power converter 2 generates double frequency ripple power, the controller 24 is configured to control the energy storage buffer circuit 23 to perform charging in a first time period, so that energy from the first power conversion circuit 20 is absorbed by using the transformer 21 to perform energy buffering, to store energy other than energy flowing to the load 15 in the energy storage buffer circuit 23. The controller 24 is configured to control the energy storage buffer circuit 23 to perform discharging in a second time period, so that energy is transferred to the second power conversion circuit 22 by using the transformer 21, to release energy stored in the energy storage buffer circuit 23 to the load 15 by using the second power conversion circuit 22. The second time period is after the first time period. The first time period and the second time period may be different working time periods of the energy storage buffer circuit 23, where the first time period is a charging time period of the energy storage buffer circuit 23, and the second time period is a discharging time period of the energy storage buffer circuit 23. In this embodiment, the controller 24 may control the energy storage buffer circuit 23 to perform charging or discharging in different working time periods, to decouple the double frequency ripple power generated by the power converter 2. This prolongs the service life of the power supply 14. In addition, the use of a large-capacity electrolytic capacitor can also be avoided. Therefore, a volume of the power converter 2 is reduced, costs are reduced, reliability of the power converter 2 is improved, and applicability is high.

In an embodiment, in the first time period, input power of the power converter 2 is greater than output power, where the input power and the output power are instantaneous power. The controller 24 is configured to control the energy storage buffer circuit 23 to perform charging, so that the energy storage buffer circuit 23 absorbs energy from the first power conversion circuit 20 by using the transformer 21 to perform energy buffering, to store the energy other than the energy flowing to the load 15 in the energy storage buffer circuit 23. The other energy is determined by the input power and the output power of the power converter 2. In the second time period, the input power of the power converter 2 is less than the output power. The controller 24 is configured to control the energy storage buffer circuit 23 to perform discharging, so that the energy storage buffer circuit 23 transfers the energy to the second power conversion circuit 22 by using the transformer 21, to release the energy stored in the energy storage buffer circuit 23 to the load 15 by using the second power conversion circuit 22. It may be understood that, because the first secondary-side winding 211 and the second secondary-side winding 212 share the same magnetic core 213, the energy storage buffer circuit 23 may transfer the energy stored in the energy storage buffer circuit 23 from the second secondary-side winding 212 to the first secondary-side winding 211 to transfer the energy to the second power conversion circuit 22. In this case, the second power conversion circuit 22 may release the energy to the load 15.

In this embodiment, in different working time periods, the controller 24 may control the first power conversion circuit 20 to charge the energy storage buffer circuit 23 or control the energy storage buffer circuit 23 to perform discharging on the second power conversion circuit 22, to decouple the double frequency ripple power generated by the power converter 2. This prolongs the service life of the power supply 14.

In an embodiment, the input power and the output power of the power converter 2 may be instantaneous power values detected by the controller 24 in real time by using a power detection device. The power detection device may be disposed inside or outside the controller 24. The power detection device may be one of a power detection circuit, a power meter, and another power detection device.

Figure 3A:
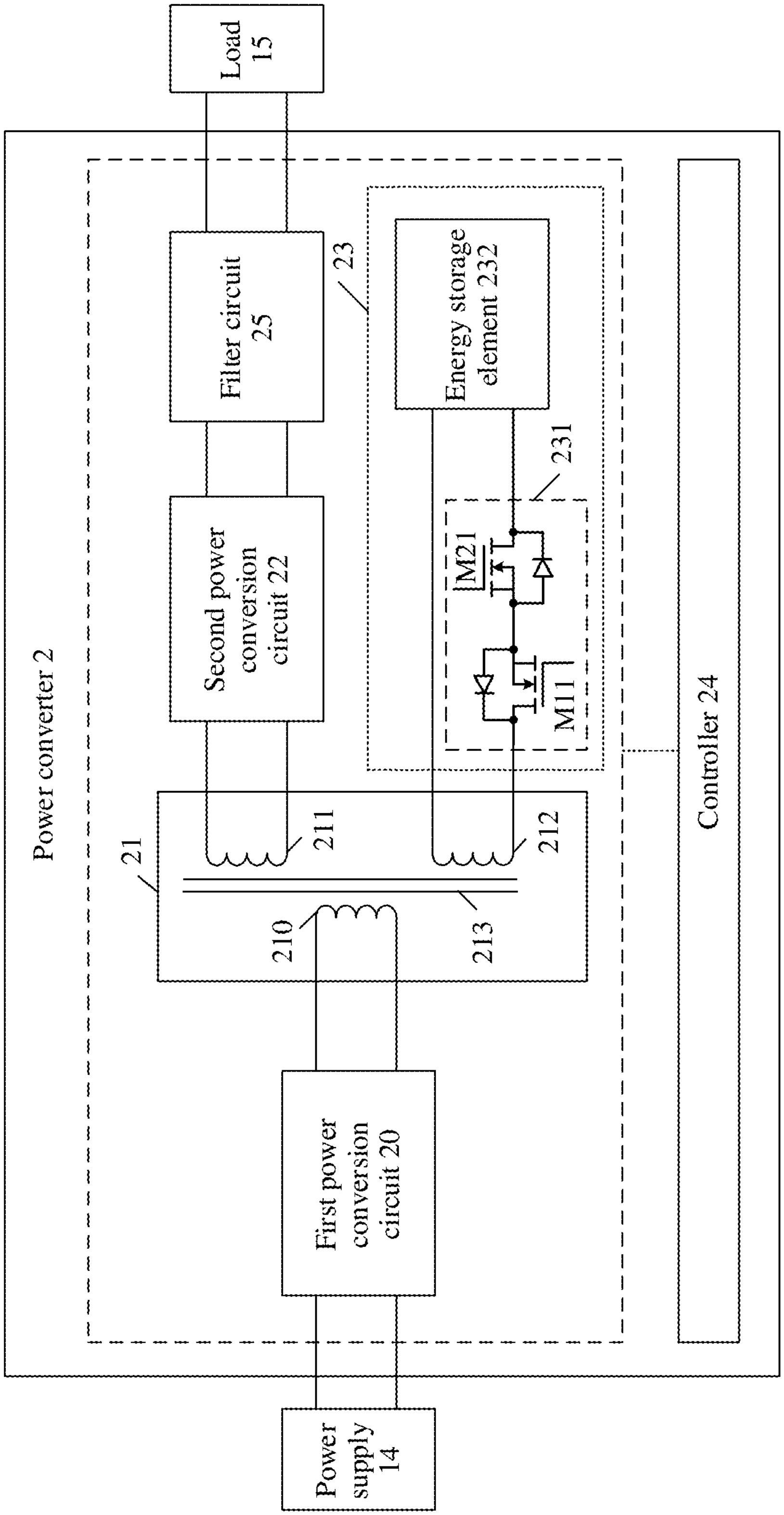
FIG. 3A is a schematic diagram of another structure of a power converter.

FIG. 3A is a schematic diagram of another structure of the power converter according to the embodiments. As shown in FIG. 3A, the energy storage buffer circuit 23 shown in FIG. 2 includes a switch unit 231 and an energy storage element 232, and the second secondary-side winding 212 may be connected to the energy storage element 232 by using the switch unit 231. In the first time period, the input power of the power converter 2 is greater than the output power. The controller 24 is configured to control the switch unit 231 to be in forward conduction, so that the energy storage element 232 absorbs the energy from the first power conversion circuit 20 by using the transformer 21 to perform energy buffering, to store the energy other than the energy flowing to the load 15 in the energy storage element 232. In the second time period, the input power of the power converter 2 is less than the output power. The controller 24 is configured to control the switch unit 231 to be in reverse conduction, so that the energy storage element 232 transfers the energy to the second power conversion circuit 22 by using the transformer 21, to release the energy stored in the energy storage element 232 to the load 15 by using the second power conversion circuit 22. In this embodiment, charging and discharging processes of the energy storage element 232 may be implemented by controlling an on/off state of the switch unit 231, to decouple the double frequency ripple power generated by the power converter 2. This prolongs the service life of the power supply 14.

In an embodiment, the energy storage element 232 is a device whose average power is 0 in the energy storage buffer circuit 23. The energy storage element 232 includes at least one of a capacitor and an inductor. It may be understood that a quantity of inductors, a quantity of capacitors, and connection relationships between the inductors and the capacitors in the energy storage element 232 may be determined by a specific circuit topology of the energy storage buffer circuit 23. This is not limited herein. For example, when the energy storage buffer circuit 23 includes a filter circuit, the energy storage element 232 may be a component whose average power is 0 in the filter circuit.

In an embodiment, as shown in FIG. 3A, the switch unit 231 includes a first switch M11 and a second switch M21. In the first time period, the input power of the power converter 2 is greater than the output power. The controller 24 is configured to: control the first switch M11 to remain in an on state or an off state, and control the second switch M21 to be on or off, so that the energy storage element 232 absorbs the energy from the first power conversion circuit 20 by using the transformer 21 to perform energy buffering, to store the energy other than the energy flowing to the load 15 in the energy storage element 232 in each on-off cycle of the second switch M21. When the first switch M11 remains in an on state or an off state, and the second switch M21 is on or off, the switch unit 231 is in a forward conduction state.

In the second time period, the input power of the power converter 2 is less than the output power. The controller 24 is configured to: control the second switch M21 to remain in an on state or an off state, and control the first switch M11 to be on or off, so that the energy storage element 232 transfers the energy to the second power conversion circuit 22 by using the transformer 21, to release the energy stored in the energy storage element 232 to the load 15 by using the second power conversion circuit 22 in each on-off cycle of the first switch M11. When the second switch M21 remains in an on state or an off state, and the first switch M11 is on or off, the switch unit 231 is in a reverse conduction state.

In this embodiment, the charging and discharging processes of the energy storage element 232 may be implemented by controlling the on/off state of the first switch M11 and the on/off state of the second switch M21, to decouple the double frequency ripple power generated by the power converter 2. This prolongs the service life of the power supply 14.

In an embodiment, the first switch M11 and the second switch M21 may be reversely connected in series to form a bidirectional switch. This improves efficiency and power density of the power converter 2.

In an embodiment, for a reverse series connection manner of the first switch M11 and the second switch M21, refer to the following description. As shown in FIG. 3A, a dotted terminal of the second secondary-side winding 212 may be connected to one end of the energy storage element 232, a non-dotted terminal of the second secondary-side winding 212 may be connected to a drain of the first switch M11, a source of the first switch M11 may be connected to a source of the second switch M21, and a drain of the second switch M21 may be connected to the other end of the energy storage element 232. Because the source of the first switch M11 is connected to the source of the second switch M21, the first switch M11 and the second switch M21 may be two switches of a common-source structure. In this case, a drive circuit corresponding to the first switch M11 and a drive circuit corresponding to the second switch M21 are powered by a same drive power supply, so that one drive power supply may be saved. This reduces circuit costs of the power converter 2.

In an embodiment, for another reverse series connection manner of the first switch M11 and the second switch M21, refer to the following description. A dotted terminal of the second secondary-side winding 212 may be connected to one end of the energy storage element 232, a non-dotted terminal of the second secondary-side winding 212 may be connected to a source of the first switch M11, a drain of the first switch M11 may be connected to a drain of the second switch M21, and a source of the second switch M21 may be connected to the other end of the energy storage element 232. Because the drain of the first switch M11 is connected to the drain of the second switch M21, the first switch M11 and the second switch M21 may be two switches of a common-drain structure. This reduces an on resistance of a switch and improves efficiency of the switch.

In an embodiment, the first switch M11 and the second switch M21 may be transistors or metal-oxide-semiconductor field-effect transistors (MOSFETs).

In an embodiment, the first switch M11 and the second switch M21 are made of gallium nitride (GaN), silicon (Si), or another material. For example, when both the first switch M11 and the second switch M21 are made of GaN, the bidirectional switch may be referred to as a high electron mobility transistor (HEMT) or a bidirectional GaN switch device.

In an embodiment, the first switch M11 and the second switch M21 may alternatively be two independent switches.

In an embodiment, a first drive circuit is disposed between the controller 24 and the first switch M11, and a second drive circuit is disposed between the controller 24 and the second switch M21. The first drive circuit is a drive circuit corresponding to the first switch M11, and the second drive circuit is a drive circuit corresponding to the second switch M21.

In an embodiment, the input power of the power converter 2 is greater than the output power in the first time period. The controller 24 is configured to generate a drive signal, and output the drive signal to the first drive circuit, so that the first drive circuit amplifies the drive signal and outputs the drive signal to the first switch M11, to control the first switch M11 to remain in an on state or an off state. The drive signal may be a high-level drive signal or a low-level drive signal. The controller 24 is configured to: obtain, based on the input power and the output power of the power converter 2, a current value flowing through the energy storage element 232, and generate a first drive signal based on the current value flowing through the energy storage element 232. The controller 24 may output the first drive signal to the second drive circuit, so that the second drive circuit amplifies the first drive signal and outputs the first drive signal to the second switch M21, to control the second switch M21 to be on or off, so as to store the energy other than the energy flowing to the load 15 in the energy storage element 232 in each on-off cycle of the second switch M21. Specific duration of the first time period may be determined by the first drive signal. For example, the first time period may be determined by duration and a quantity of on-off cycles of the second switch M21 in the first drive signal.

In this embodiment, the drive circuit amplifies the drive signal to control the on/off state of the first switch M11 and the on/off state of the second switch M21, so that stress of the first switch M11 and the second switch M21 can be reduced, reliability and conversion efficiency of the power converter 2 are improved, and applicability is higher.

In an embodiment, when the first switch M11 remains in an on state, that is, the first switch M11 is normally closed, the first switch M11 is equivalent to a conducting wire, and in this case, a current flows through the first switch M11, the second switch M21, or a parasitic diode inside the second switch M21. When the first switch M11 remains in an off state, that is, the first switch M11 is normally opened, a current flows through a parasitic diode inside the first switch M11, the second switch M21, or the parasitic diode inside the second switch M21.

In an embodiment, the input power of the power converter 2 is less than the output power in the second time period. The controller 24 is configured to: obtain, based on the input power and the output power of the power converter 2, a current value flowing through the energy storage element 232, and generate a second drive signal based on the current value flowing through the energy storage element 232. Further, the controller 24 is configured to output the second drive signal to the first drive circuit, so that the first drive circuit amplifies the second drive signal and outputs the second drive signal to the first switch M11, to control the first switch M11 to be on or off, so as to release the energy stored in the energy storage element 232 to the load 15 by using the second power conversion circuit 22 in each on-off cycle of the first switch M11. Specific duration of the second time period may be determined by the second drive signal. For example, the second time period may be determined by duration and a quantity of on-off cycles of the first switch M11 in the second drive signal. The controller 24 is configured to generate a drive signal, and output the drive signal to the second drive circuit, so that the second drive circuit amplifies the drive signal and outputs the drive signal to the second switch M21, to control the second switch M21 to remain in an on state or an off state. The drive signal may be a high-level drive signal or a low-level drive signal.

In this embodiment, the drive circuit amplifies the drive signal to control the on/off state of the first switch M11 and the on/off state of the second switch M21, so that stress of the first switch M11 and the second switch M21 can be reduced, reliability and conversion efficiency of the power converter 2 are improved, and applicability is higher.

In an embodiment, when the second switch M21 remains in an on state, that is, the second switch M21 is normally closed, the second switch M21 is equivalent to a conducting wire, and in this case, a current flows through the second switch M21, the first switch M11, or a parasitic diode inside the first switch M11. When the second switch M21 remains in an off state, that is, the second switch M21 is normally opened, a current flows through a parasitic diode inside the second switch M21, the first switch M11, or the parasitic diode inside the first switch M11.

In an embodiment, the first drive signal and the second drive signal may be pulse width modulation (PWM) signals or drive signals of another type. Both the first drive signal and the second drive signal include a switch duty cycle and a switching frequency. For example, the first drive signal and the second drive signal may be square wave signals.

In an embodiment, as shown in FIG. 3A, the power converter 2 shown in FIG. 2 further includes a filter circuit 25. When the power converter 2 is a DC/AC converter, the second power conversion circuit 22 is configured to output an alternating current to the filter circuit 25. Alternatively, when the power converter 2 is an AC/DC converter, the second power conversion circuit 22 is configured to output a direct current to the filter circuit 25. The filter circuit 25 is configured to filter an alternating current or a direct current output by the second power conversion circuit 22, and supply power to the load 15.

In an embodiment, the filter circuit 25 may be one of a capacitor filter circuit, an inductor filter circuit, an RC filter circuit, an LC filter circuit, and an active filter circuit.

In an embodiment, the filter circuit 25 may alternatively be integrated inside the second power conversion circuit 22.

Figure 3B:
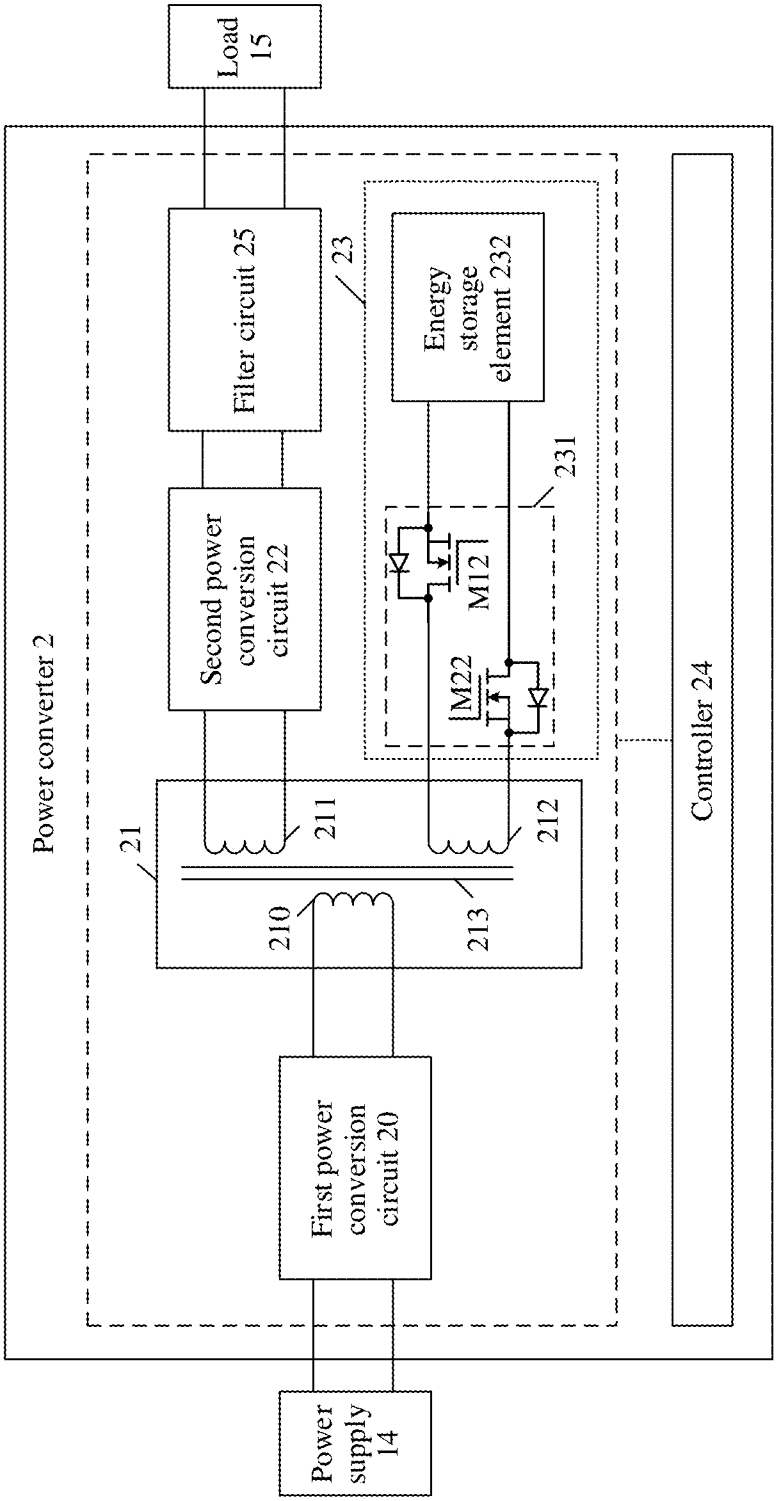
FIG. 3B is a schematic diagram of another structure of a power converter.

FIG. 3B is a schematic diagram of another structure of the power converter according to the embodiments. The energy storage buffer circuit 23 shown in FIG. 3A may alternatively be replaced with an energy storage buffer circuit 23 shown in FIG. 3B. The energy storage buffer circuit 23 includes a switch unit 231 and an energy storage element 232. The switch unit 231 includes a first switch M12 and a second switch M22. The dotted terminal of the second secondary-side winding 212 is connected to one end of the energy storage element 232 by using the first switch M12, and the non-dotted terminal of the second secondary-side winding 212 is connected to the other end of the energy storage element 232 by using the second switch M22. The first switch M11 and the second switch M21 are not two switches of the common-source structure or the common-drain structure. In this case, a drive circuit corresponding to the first switch M11 and a drive circuit corresponding to the second switch M21 are powered by two drive power supplies. This can improve power supply reliability of the drive circuit.

In the first time period, the input power of the power converter 2 is greater than the output power. The controller 24 may control the first switch M12 to remain in an on state or an off state, and control the second switch M22 to be on or off, so that the energy storage element 232 absorbs the energy from the first power conversion circuit 20 by using the transformer 21 to perform energy buffering, to store the energy other than the energy flowing to the load 15 in the energy storage element 232 in each on-off cycle of the second switch M22. In the second time period, the input power of the power converter 2 is less than the output power. The controller 24 may control the second switch M22 to remain in an on state or an off state, and control the first switch M12 to be on or off, so that the energy storage element 232 transfers the energy to the second power conversion circuit 22 by using the transformer 21, to release the energy stored in the energy storage element 232 to the load 15 by using the second power conversion circuit 22 in each on-off cycle of the first switch M12.

In this embodiment, the controller 24 may implement the charging and discharging processes of the energy storage element 232 by controlling the on/off state of the first switch M12 and the on/off state of the second switch M22, to decouple the double frequency ripple power generated by the power converter 2. This prolongs the service life of the power supply 14.

It may be understood that, for a specific implementation in which the controller 24 controls the on/off state of the first switch M12 and the on/off state of the second switch M22, refer to the specific implementation in which the controller 24 controls the on/off state of the first switch M11 and the on/off state of the second switch M21 in the embodiment corresponding to FIG. 3A. Details are not described herein again.

In an embodiment, the first switch M12 and the second switch M22 may be transistors or metal-oxide-semiconductor field-effect transistors.

Figure 4A:
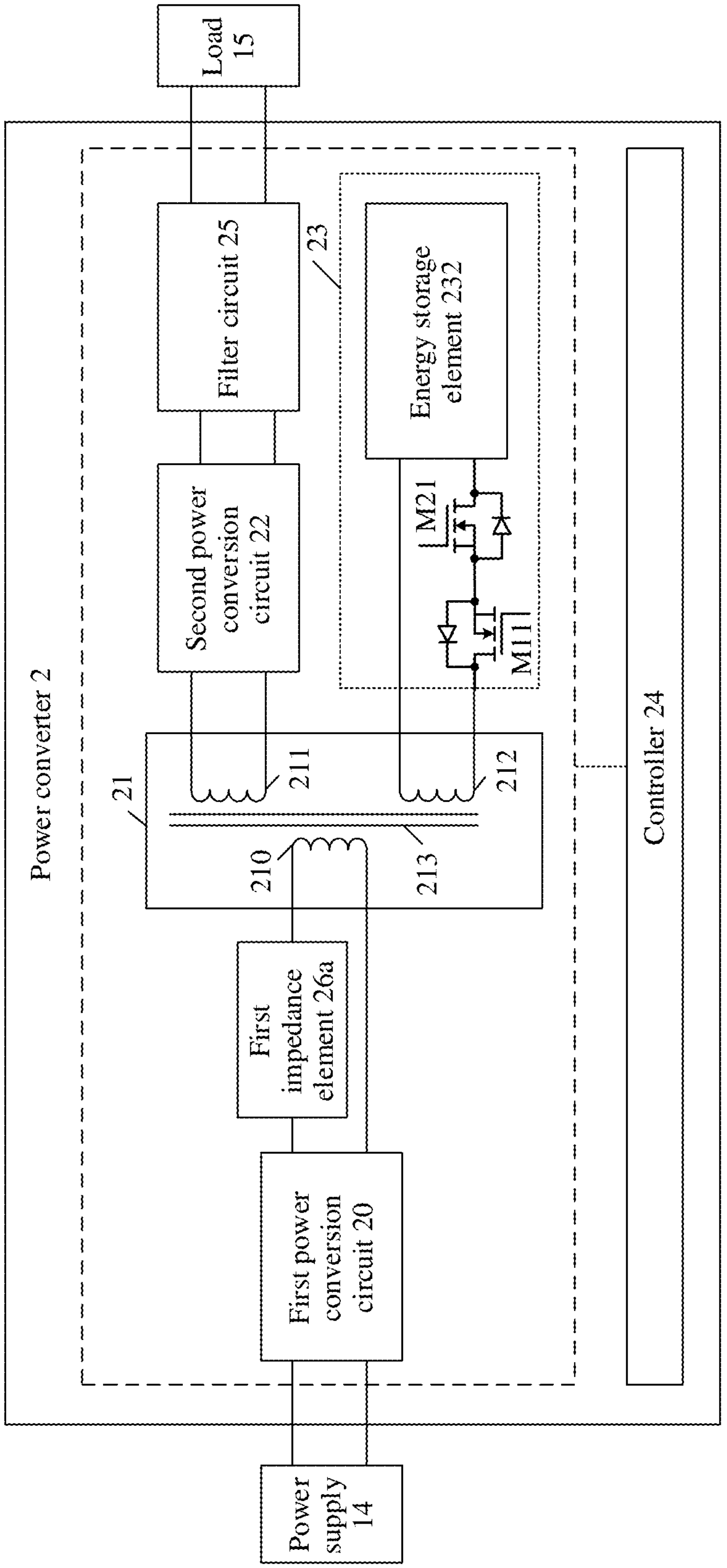
FIG. 4A is a schematic diagram of another structure of a power converter.
Figure 4B:
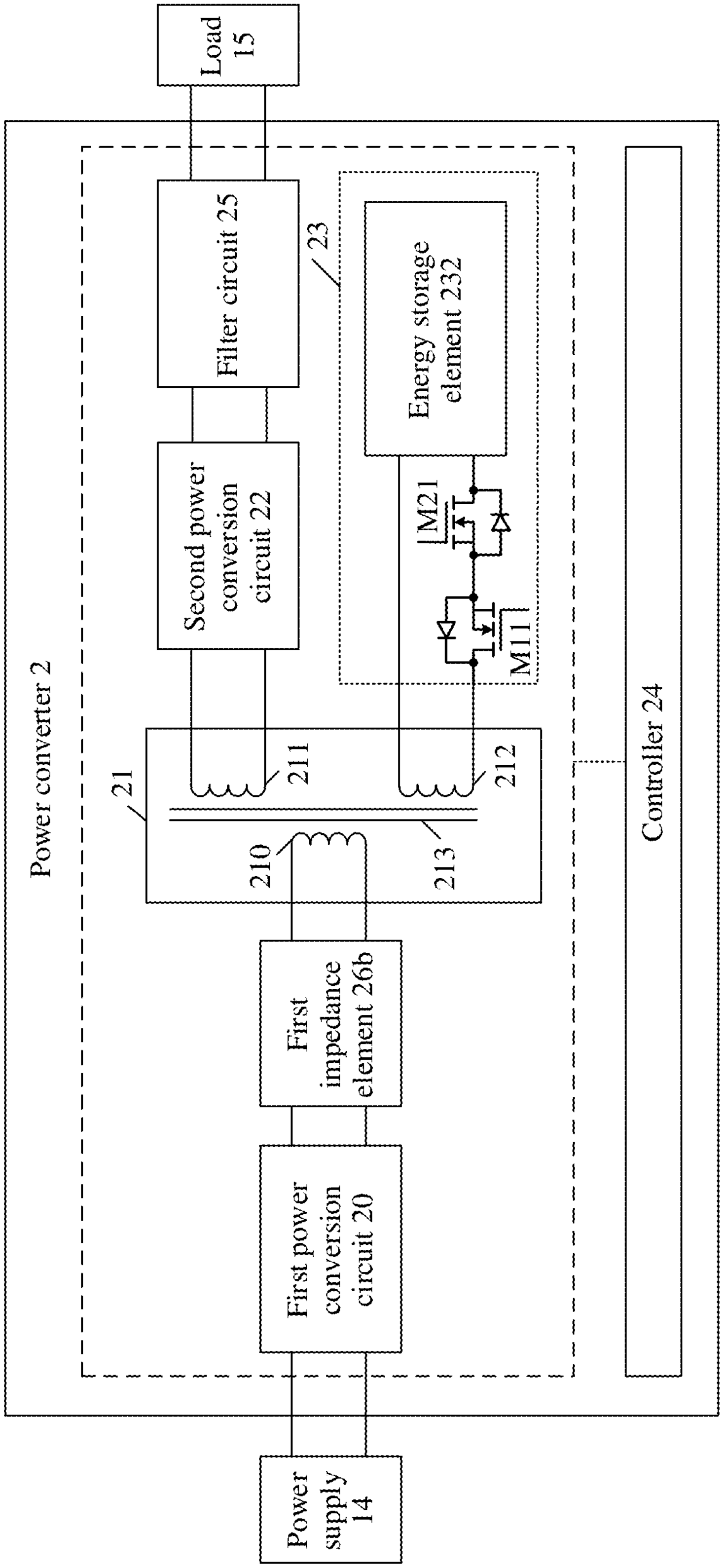
FIG. 4B is a schematic diagram of another structure of a power converter.

In an embodiment, as shown in FIG. 4A, the power converter 2 shown in FIG. 3A further includes a first impedance element 26*a*, where the output of the first power conversion circuit 20 is connected in series to the first impedance element 26*a* and then connected to the primary-side winding 210. As shown in FIG. 4B, the power converter 2 shown in FIG. 3A further includes a first impedance element 26*b*, where the output of the first power conversion circuit 20 is connected in parallel to the first impedance element 26*b* and then connected to the primary-side winding 210.

With reference to FIG. 4A and FIG. 4B, it can be understood that the output of the first power conversion circuit 20 is connected in series or in parallel to the first impedance element and then connected to the primary-side winding 210 to form a resonant circuit. This reduces a switching loss of the power converter 2, and improves conversion efficiency and a gain of the power converter 2. The first impedance element may be the first impedance element 26*a* or the first impedance element 26*b*, and the first impedance element may be a resonant element.

The first impedance element includes at least one of a parasitic inductor of the transformer 21, an inductor outside the transformer 21, a parasitic capacitor of the transformer 21, or a capacitor outside the transformer 21, and the parasitic inductor and the parasitic capacitor of the transformer 21 may be a parasitic inductor and a parasitic capacitor on one side of the primary-side winding 210.

For example, the first impedance element may be the parasitic inductor of the transformer 21, or the inductor outside the transformer 21, or the parasitic inductor of the transformer 21 and the inductor outside the transformer 21. For example, the first impedance element may be the parasitic capacitor of the transformer 21, or the capacitor outside the transformer 21, or the parasitic capacitor of the transformer 21 and the capacitor outside the transformer 21.

It may be understood that the first impedance element 26*a* or the first impedance element 26*b* may alternatively be disposed in the power converter 2 shown in FIG. 3B. For a specific manner of disposing the first impedance element 26*a* or the first impedance element 26*b*, refer to FIG. 4A and FIG. 4B and the embodiments corresponding to FIG. 4A and FIG. 4B. Details are not described herein again.

Figure 5A:
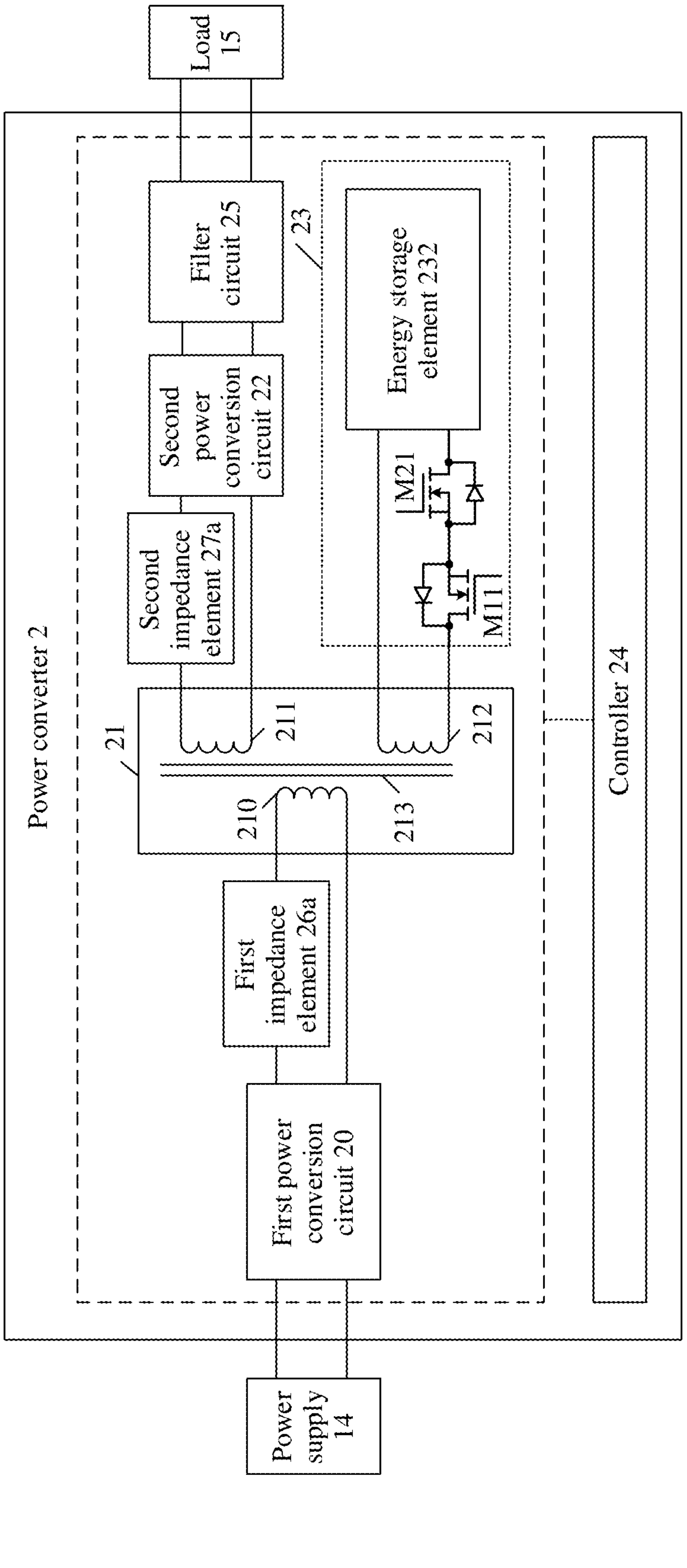
FIG. 5A is a schematic diagram of another structure of a power converter.
Figure 5B:
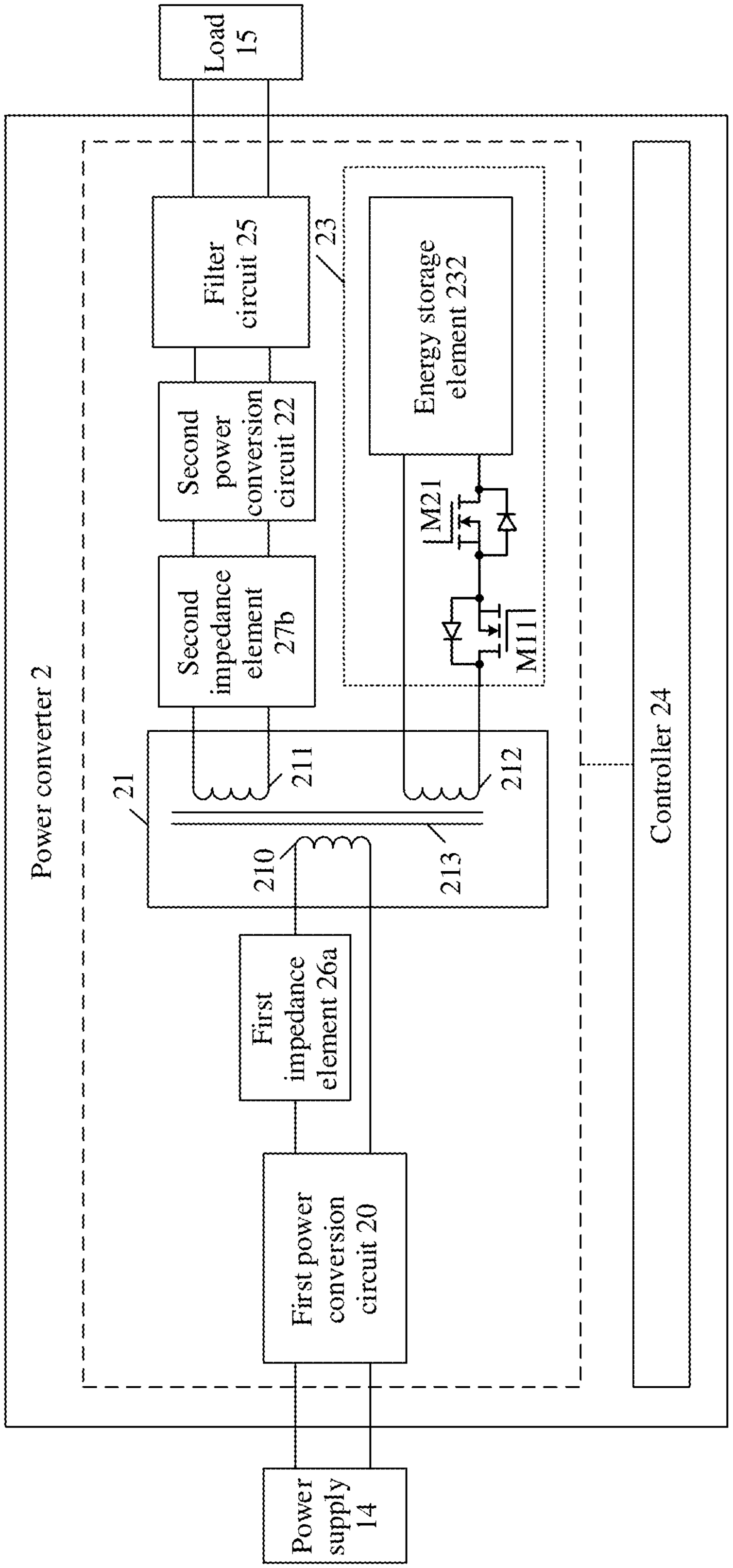
FIG. 5B is a schematic diagram of another structure of a power converter.

In an embodiment, as shown in FIG. 5A, the power converter 2 shown in FIG. 4A further includes a second impedance element 27*a*, where the first secondary-side winding 211 is connected in series to the second impedance element 27*a* and then connected to the input of the second power conversion circuit 22. As shown in FIG. 5B, the power converter 2 shown in FIG. 4A further includes a second impedance element 27*b*, where the first secondary-side winding 211 is connected in parallel to the second impedance element 27*b* and then connected to the input of the second power conversion circuit 22.

With reference to FIG. 5A and FIG. 5B, it can be understood that the first secondary-side winding 211 is connected in series or in parallel to the second impedance element and then connected to the input of the second power conversion circuit 22 to form a resonant circuit. This reduces a switching loss of the power converter 2, and improves conversion efficiency and a gain of the power converter 2. The second impedance element may be the second impedance element 27*a* or the second impedance element 27*b*, and the second impedance element may be a resonant element.

The second impedance element includes at least one of a parasitic inductor of the transformer 21, an inductor outside the transformer 21, a parasitic capacitor of the transformer 21, and a capacitor outside the transformer 21, and the parasitic inductor and the parasitic capacitor of the transformer 21 may be a parasitic inductor and a parasitic capacitor on one side of the first secondary-side winding 211.

For example, the second impedance element may be the parasitic inductor of the transformer 21, or the inductor outside the transformer 21, or the parasitic inductor of the transformer 21 and the inductor outside the transformer 21. For example, the second impedance element may be the parasitic capacitor of the transformer 21, or the capacitor outside the transformer 21, or the parasitic capacitor of the transformer 21 and the capacitor outside the transformer 21.

In an embodiment, the power converter 2 shown in FIG. 5A and FIG. 5B may not include the first impedance element 26*a*.

In an embodiment, the power converter 2 shown in FIG. 4B may further include a second impedance element. For a circuit connection manner of the second impedance element, refer to the embodiments corresponding to FIG. 5A and FIG. 5B. Details are not described herein again.

It may be understood that the second impedance element 27*a* or the second impedance element 27*b* may alternatively be disposed in the power converter 2 shown in FIG. 3B. For a specific manner of disposing the second impedance element 27*a* or the second impedance element 27*b*, refer to FIG. 5A and FIG. 5B and the embodiments corresponding to FIG. 5A and FIG. 5B. Details are not described herein again.

Figure 6:
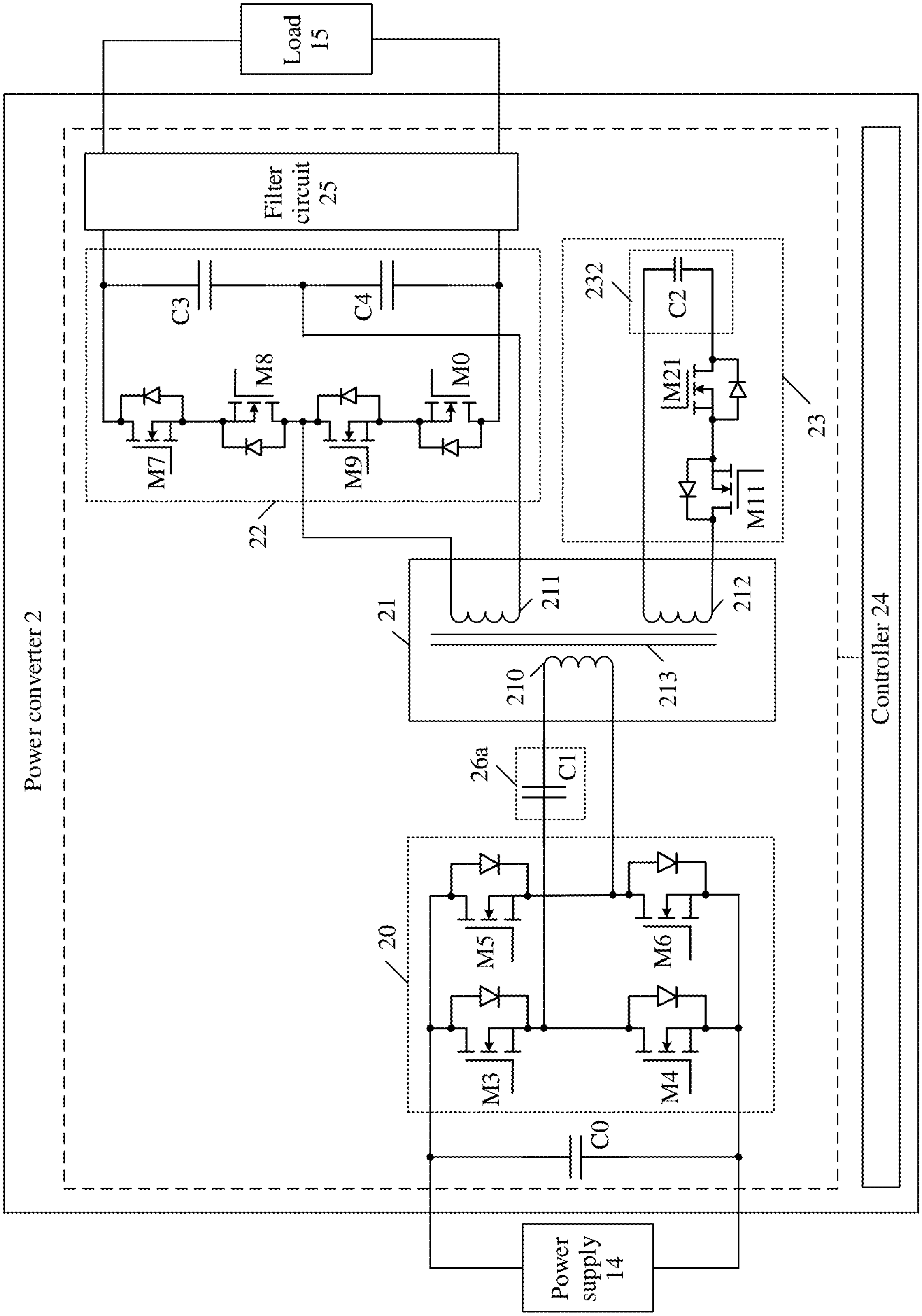
FIG. 6 is a schematic diagram of a circuit structure of a power converter.

FIG. 6 is a schematic diagram of a circuit structure of a power converter according to the embodiments. When the power converter 2 is a DC/AC converter, a circuit structure of the power converter 2 is shown in FIG. 6. The first power conversion circuit 20 shown in FIG. 4A includes a switch M3, a switch M4, a switch M5, and a switch M6, where the switch M3 and the switch M4 are connected in series, and the switch M5 and the switch M6 are connected in series. Two ends other than series connection ends of the switch M3 and the switch M4 may serve as the input of the first power conversion circuit 20, and the series connection ends of the switch M3 and the switch M4 and series connection ends of the switch M5 and the switch M6 may serve as the output of the first power conversion circuit 20.

The second power conversion circuit 22 includes a switch M7, a switch M8, a switch M9, a switch M0, a capacitor C3, and a capacitor C4, where the switch M7, the switch M8, the switch M9, and the switch M0 are connected in series, and the capacitor C3 and the capacitor C4 are connected in series. Series connection ends of the switch M8 and the switch M9 and series connection ends of the capacitor C3 and the capacitor C4 may serve as the input of the second power conversion circuit 22, and two ends other than the series connection ends of the capacitor C3 and the capacitor C4 may serve as the output of the second power conversion circuit 22. Because the capacitor C3 and the capacitor C4 are impedance components, that is, the capacitor C3 and the capacitor C4 are resonant components, the second power conversion circuit 22 and the first secondary-side winding 211 may form a resonant circuit, to reduce a switching loss of the second power conversion circuit 22, and improve conversion efficiency and a gain of the second power conversion circuit 22.

In the second power conversion circuit 22, the switch M7 and the switch M8 are reversely connected in series, and the switch M7 and the switch M8 are two switches of a common-source structure. In this case, a drive circuit corresponding to the switch M7 and a drive circuit corresponding to the switch M8 may be powered by a same drive power supply, so that one drive power supply may be saved, and costs of the power converter 2 are further reduced.

In the second power conversion circuit 22, the switch M9 and the switch M0 are reversely connected in series, and the switch M9 and the switch M0 are two switches of a common-source structure. In this case, a drive circuit corresponding to the switch M9 and a drive circuit corresponding to the switch M0 may be powered by a same drive power supply, so that one drive power supply may be saved, and costs of the power converter 2 are further reduced.

The energy storage buffer circuit 23 includes the first switch M11, the second switch M21, and the energy storage element 232. For example, the energy storage element 232 may be a capacitor C2.

The first impedance element 26*a* includes a capacitor C1, and the output of the first power conversion circuit 20 is connected to the capacitor C1 in series and then connected to the primary-side winding 210.

The power converter 2 further includes an electrolytic capacitor C0, and the electrolytic capacitor C0 is connected in parallel to the input of the first power conversion circuit 20.

In an embodiment, when the power converter 2 supplies power to the load 15, the controller 24 may control each of the switch M3, the switch M4, the switch M5, and the switch M6 to be on or off, so that the first power conversion circuit 20 inverts a direct current provided by the power supply 14 to an alternating current.

In the first time period, the controller 24 may control the first power conversion circuit 20 to output, by using the transformer 21, a part of the alternating current to the second power conversion circuit 22, and output the other part of the alternating current to the energy storage buffer circuit 23, where the part of the alternating current is determined by a power supply requirement of the load 15. Further, the controller 24 may control each of the switch M7, the switch M8, the switch M9, and the switch M0 to be on or off, so that the second power conversion circuit 22 converts a part of the alternating current to a target alternating current, and supplies power to the load 15 after the target alternating current is filtered by the filter circuit 25. The controller 24 may control the first switch M11 to remain in an on state or an off state, and control, based on a first drive signal, the second switch M21 to be on or off, to charge the capacitor C2 based on the other part of the alternating current, so as to store energy other than energy flowing to the load 15 in the capacitor C2. The energy flowing to the load 15 is determined by the foregoing part of the alternating current, and other energy is determined by the foregoing another part of the alternating current.

In the second time period, the controller 24 controls the first power conversion circuit 20 to output all alternating currents to the second power conversion circuit 22 by using the transformer 21. Further, the controller 24 controls the second switch M21 to remain in an on state or an off state, and controls, based on a second drive signal, the first switch M11 to be on or off, so that the capacitor C2 performs discharging on the second power conversion circuit 22, to release other energy stored in the capacitor C2 to the second power conversion circuit 22. The controller 24 may control each of the switch M7, the switch M8, the switch M9, and the switch M0 to be on or off, so that the second power conversion circuit 22 supplies power to the load 15 based on all alternating currents and other energy, so that the load 15 works.

In this embodiment, the controller 24 may flexibly control an on/off state of the first switch M11 and an on/off state of the second switch M21 in different working time periods to implement charging and discharging processes of the capacitor C2, to decouple double frequency ripple power generated by the power converter 2. This prolongs a service life of the power supply 14.

In an embodiment, because charging and discharging processes of the capacitor C2 may be used to decouple the double frequency ripple power generated by the power converter 2, the capacitor C2 may be referred to as a decoupling capacitor, and the energy storage buffer circuit 23 may be referred to as a decoupling circuit.

In an embodiment, when the second secondary-side winding 212 is a boost winding, the transformer 21 may boost the alternating current voltage output by the first power conversion circuit 20 to the energy storage buffer circuit 23, to increase an electric potential difference U between two plates of the capacitor C2. According to $E_c=1/CU^2$, when the electric potential difference U increases, a capacitance C of the capacitor C2 is greatly reduced, to further reduce the volume of the power converter 2 and the costs of the power converter 2. In the formula, $E_c$ is the energy stored in the capacitor C2. The alternating current voltage output by the first power conversion circuit 20 to the energy storage buffer circuit 23 is determined by another part of the alternating current output by the first power conversion circuit 20 to the energy storage buffer circuit 23. In addition, the power converter 2 decouples the double frequency ripple power by implementing the charging and discharging processes of the capacitor C2, so that use of the electrolytic capacitor C0 can be avoided, and reliability of the power converter 2 is further improved.

In an embodiment, the power converter 2 shown in FIG. 6 may not include the electrolytic capacitor C0, or the electrolytic capacitor C0 is a small-capacity electrolytic capacitor. Therefore, a volume of the power converter 2 is reduced, costs are reduced, and applicability is higher.

It may be understood that the energy storage buffer circuit 23 shown in FIG. 6 may alternatively be replaced with the energy storage buffer circuit 23 shown in FIG. 3B.

Figure 7:
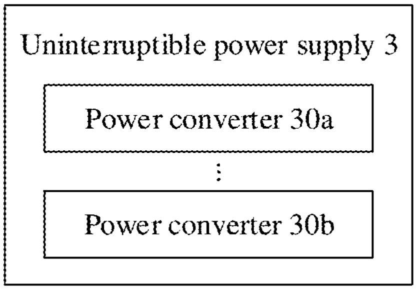
FIG. 7 is a schematic diagram of a structure of an uninterruptible power supply.

In an embodiment, when the power converter is applied to an uninterruptible power supply, refer to FIG. 7. FIG. 7 is a schematic diagram of a structure of an uninterruptible power supply according to the embodiments. As shown in FIG. 7, an uninterruptible power supply 3 includes a power converter 30*a* to a power converter 30*b*. For each power converter, the power converter includes a first power conversion circuit, a transformer, a second power conversion circuit, and an energy storage buffer circuit. In a first time period, input power of the power converter is greater than output power, and the energy storage buffer circuit is configured to perform charging, to absorb energy from the first power conversion circuit by using the transformer to perform energy buffering, so as to store energy other than energy flowing to a load into the energy storage buffer circuit. In a second time period, the input power of the power converter is less than the output power, and the energy storage buffer circuit is configured to perform discharging, to transfer energy to the second power conversion circuit by using the transformer, so as to release energy stored in the energy storage buffer circuit to the load by using the second power conversion circuit. In this implementation, the energy storage buffer circuit may perform charging and discharging to decouple double frequency ripple power generated by the power converter. This prolongs the service life of the uninterruptible power supply 3, and improves power supply efficiency of the uninterruptible power supply 3, and applicability is high. In addition, because the power converter has a smaller size and lower costs, an overall size of the uninterruptible power supply 3 may be reduced, and costs of the uninterruptible power supply 3 are reduced. It may be understood that, for a specific structure and a working principle of each power converter, refer to the embodiments corresponding to FIG. 2 to FIG. 6. Details are not described herein again.

Figure 8:
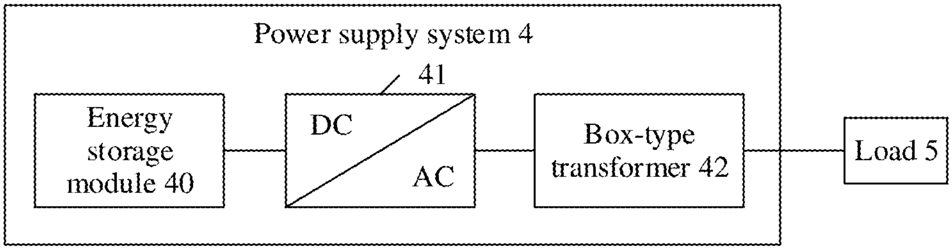
FIG. 8 is a schematic diagram of a structure of a power supply system.

In an embodiment, when the power converter is applied to a power supply system, refer to FIG. 8. FIG. 8 is a schematic diagram of a structure of a power supply system according to the embodiments. As shown in FIG. 8, a power supply system 4 includes an energy storage module 40, a power converter 41, and a box-type transformer 42. The energy storage module 40 is connected to an input of the power converter 41, an output of the power converter 41 is connected to an input of the box-type transformer 42, and an output of the box-type transformer 42 is configured to connect to a load 5. For example, the load 5 may be a power grid, a home device, an industrial power consuming device, a commercial power consuming device, or another power consuming device.

The power converter 41 includes a first power conversion circuit, a transformer, a second power conversion circuit, and an energy storage buffer circuit. In a first time period, input power of the power converter 41 is greater than output power, and the energy storage buffer circuit is configured to perform charging, to absorb energy from the first power conversion circuit by using the transformer to perform energy buffering, so as to store energy other than energy flowing to the load 5 in the energy storage buffer circuit. In a second time period, the input power of the power converter 41 is less than the output power, and the energy storage buffer circuit is configured to perform discharging, to transfer energy to the second power conversion circuit by using the transformer, so as to release energy stored in the energy storage buffer circuit to the load 5 by using the second power conversion circuit. In this implementation, the energy storage buffer circuit may perform charging and discharging to decouple double frequency ripple power generated by the power converter 41. This prolongs the service life of the energy storage module 10, and improves power supply efficiency of the energy storage module 10, and applicability is high. It may be understood that, for a specific structure and a working principle of the power converter 41, refer to the embodiments corresponding to FIG. 2 to FIG. 6. Details are not described herein again.

Figure 9:
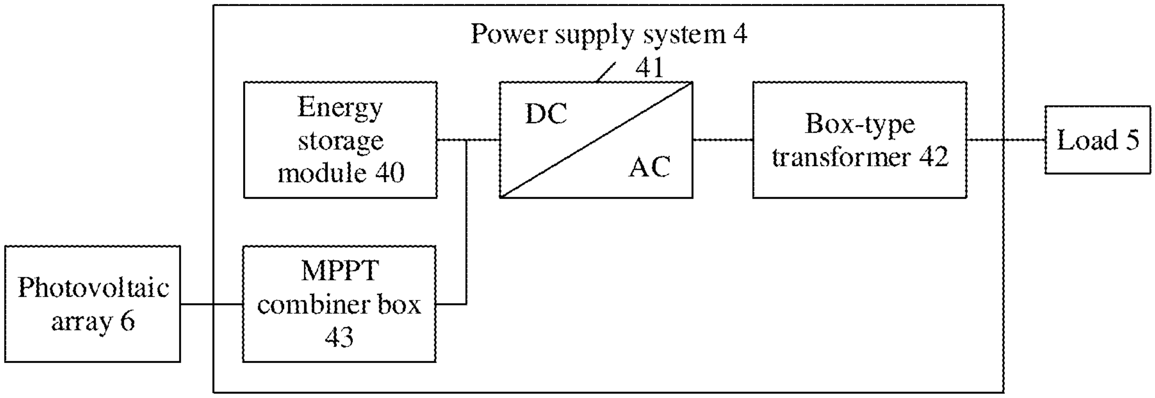
FIG. 9 is a schematic diagram of another structure of a power supply system.

In an embodiment, in a photovoltaic power supply application scenario, as shown in FIG. 9, the power supply system 4 shown in FIG. 8 further includes an MPPT combiner box 43. An input of the MPPT combiner box 43 is configured to connect to a photovoltaic array 6, and an output of the MPPT combiner box 43 is connected to the power converter 41. The MPPT combiner box 43 is configured to combine direct currents provided by a photovoltaic array 6, and output a first direct current to the power converter 41. The power converter 41 is configured to: invert the first direct current to an alternating current, and supply power to the load 5 based on the alternating current. In this power supply process, the power converter 41 may further decouple the double frequency ripple power generated by the power converter 41. This prolongs a service life of the photovoltaic array 6 and improves power supply efficiency of the photovoltaic array 6.

Figure 10:
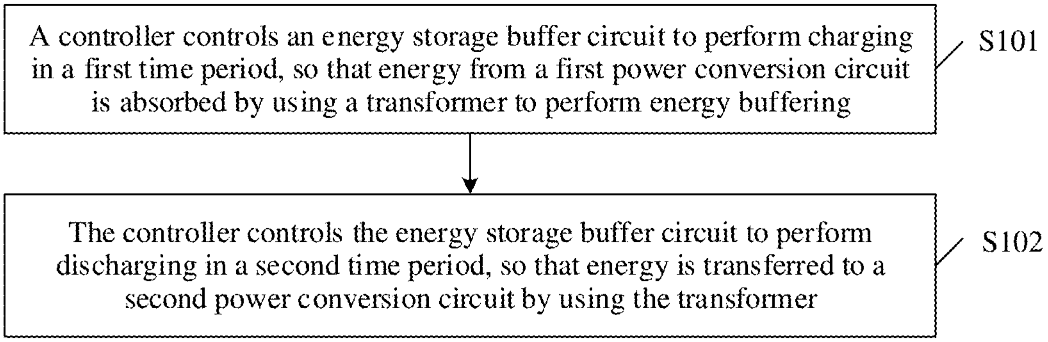
FIG. 10 is a schematic flowchart of a control method for a power converter.

FIG. 10 is a schematic flowchart of a control method for a power converter according to the embodiments. The method may be performed by a controller in the power converter. As shown in FIG. 10, the method includes step S101 and step S102.

Step S101: The controller controls an energy storage buffer circuit to perform charging in a first time period, so that energy from the first power conversion circuit is absorbed by using the transformer to perform energy buffering.

In an embodiment, the transformer includes a primary-side winding, a first secondary-side winding, and a second secondary-side winding, an input of the first power conversion circuit is configured to connect to a power supply, an output of the first power conversion circuit is connected to the primary-side winding, and the energy storage buffer circuit is connected to the second secondary-side winding.

In an embodiment, in the first time period, input power of the power converter is greater than output power, and the controller may control the energy storage buffer circuit to perform charging, so that the energy storage buffer circuit absorbs the energy from the first power conversion circuit by using the transformer to perform energy buffering, to store energy other than energy flowing to the load into the energy storage buffer circuit. The first time period is a charging time period of the energy storage buffer circuit. In this embodiment, the controller may control, in the first time period, the first power conversion circuit to charge the energy storage buffer circuit, to decouple double frequency ripple power generated by the power converter. This prolongs a service life of the power supply.

In an embodiment, the energy storage buffer circuit includes a switch unit and an energy storage element, and the second secondary-side winding may be connected to the energy storage element by using the switch unit. In the first time period, the input power of the power converter is greater than the output power, and the controller may control the switch unit to be in forward conduction, so that the energy storage element absorbs the energy from the first power conversion circuit by using the transformer to perform energy buffering, to store the energy other than the energy flowing to the load into the energy storage buffering circuit. In this implementation, charging and discharging processes of the energy storage element may be implemented by controlling an on/off state of the switch unit, to decouple the double frequency ripple power generated by the power converter. This prolongs the service life of the power supply.

In an embodiment, when the switch unit includes a first switch and a second switch, the controller may control the first switch to remain in an on state or an off state, and control the second switch to be on or off, so that the energy storage element absorbs the energy from the first power conversion circuit by using the transformer to perform energy buffering, to store the energy other than the energy flowing to the load into the energy storage element in each on-off cycle of the second switch. When the first switch remains in an on state or an off state, and the second switch is on or off, the switch unit is in a forward conduction state. During specific implementation, the controller may generate a drive signal, and control, based on the drive signal, the first switch to remain in an on state or an off state. The drive signal may be a high-level drive signal or a low-level drive signal. Further, the controller may obtain, based on the input power and the output power of the power converter, a current value flowing through the energy storage element, generate a first drive signal based on the current value flowing through the energy storage element, and control, based on the first drive signal, the second switch to be on or off. Duration of the first time period is determined by the first drive signal. For example, the duration of the first time period may be determined by duration and a quantity of on-off cycles of the second switch in the first drive signal.

In this embodiment, the controller may implement a charging process of the energy storage element by controlling the on/off state of the first switch and the on/off state of the second switch, to decouple the double frequency ripple power generated by the power converter. This prolongs the service life of the power supply.

Step S102: The controller controls the energy storage buffer circuit to perform discharging in a second time period, so that energy is transferred to a second power conversion circuit by using the transformer.

In an embodiment, an input of the second power conversion circuit may be connected to the first secondary-side winding, an output of the second power conversion circuit is configured to connect to a load, and the second time period is after the first time period. The first time period and the second time period are different working time periods of the energy storage buffer circuit, the first time period is a charging time period of the energy storage buffer circuit, and the second time period is a discharging time period of the energy storage buffer circuit.

In an embodiment, in the second time period, the input power of the power converter is less than the output power, and the controller may control the energy storage buffer circuit to perform discharging, so that the energy storage buffer circuit transfers the energy to the second power conversion circuit by using the transformer, to release the energy stored in the energy storage buffer circuit to the load by using the second power conversion circuit. In this embodiment, the controller may control, in the second time period, the energy storage buffer circuit to perform discharging on the second power conversion circuit, to release the energy to the load to supply power, thereby decoupling the double frequency ripple power generated by the power converter, and prolonging the service life of the power supply.

In an embodiment, in the second time period, the input power of the power converter is less than the output power, and the controller may control the switch unit to be in reverse conduction, so that the energy storage buffer circuit transfers the energy to the second power conversion circuit by using the transformer, to release the energy stored in the energy storage buffer circuit to the load by using the second power conversion circuit. In this implementation, a discharging process of the energy storage element may be implemented by controlling an on/off state of the switch unit, to decouple the double frequency ripple power generated by the power converter. This prolongs the service life of the power supply.

In an embodiment, in the second time period, the input power of the power converter is less than the output power, the controller may control the second switch to remain in an on state or an off state, and control the first switch to be on or off, so that the energy storage element transfers the energy to the second power conversion circuit by using the transformer, to release the energy stored in the energy storage element to the load by using the second power conversion circuit in each on-off cycle of the first switch. When the second switch remains in an on state or an off state, and the first switch is on or off, the switch unit is in a reverse conduction state. During specific implementation, the controller may obtain, based on the input power and the output power of the power converter, a current value flowing through the energy storage element, generate a second drive signal based on the current value flowing through the energy storage element, and control, based on the second drive signal, the first switch to be on or off. Duration of the second time period is determined by the second drive signal. For example, the duration of the second time period may be determined by duration and a quantity of on-off periods of the first switch in the second drive signal. Further, the controller may generate a drive signal, and control, based on the drive signal, the second switch to remain in an on state or an off state. The drive signal may be a high-level drive signal or a low-level drive signal.

In this implementation, the controller may implement a discharging process of the energy storage element by controlling the on/off state of the first switch and the on/off state of the second switch, to decouple the double frequency ripple power generated by the power converter. This prolongs the service life of the power supply.

During specific implementation, for more operations performed by the controller in the control method for the power converter provided in the embodiments, refer to the implementations performed by the controller 24 in the power converter 2 and working principles of the power converter 2 shown in FIG. 2 to FIG. 6. Details are not described herein again.

In the method provided in the embodiments, the controller may flexibly control an on/off state of the first switch and an on/off state of the second switch in different working time periods to implement charging and discharging processes of the energy storage element, to decouple the double frequency ripple power generated by the power converter. This prolongs the service life of the power supply.

The foregoing descriptions are merely implementations of embodiments, but are not intended as limiting. Any variation or replacement readily figured out by a person skilled in the art shall fall within the scope of the embodiments.

What is claimed is:

1. A micro inverter connected between a photovoltaic module and a load or a power grid, the micro inverter comprising:

a transformer comprising
  a primary-side winding,
  a first secondary-side winding, and
  a second secondary-side winding;

a first power conversion circuit, wherein an input of the first power conversion circuit is configured to connect to the photovoltaic module, an output of the first power conversion circuit is connected to the primary-side winding, and the first power conversion circuit is configured to convert a direct current to a high-frequency alternating current;

a second power conversion circuit, wherein an input of the second power conversion circuit is connected to the first secondary-side winding, an output of the second power conversion circuit is configured to connect to the load or the power grid, and the second power conversion circuit is configured to convert a high-frequency alternating current boosted by the transformer to an alternating current adapted to the power grid or the load;

an energy storage buffer circuit comprising a pair of transistors, wherein the pair of transistors are reversely connected in series to form a bidirectional switch and the energy storage buffer circuit is connected to the second secondary-side winding; and a controller configured to:

control an input voltage of the first power conversion circuit, adjust a working voltage of the photovoltaic module connected to the micro inverter, and perform maximum power point tracking on the photovoltaic module; and the controller is further configured to:

control the energy storage buffer circuit to perform charging in a first time period, so that energy from the first power conversion circuit is absorbed by using the transformer to perform energy buffering; and control the energy storage buffer circuit to perform discharging in a second time period, so that energy is transferred to the second power conversion circuit by using the transformer, wherein the second time period is after the first time period.

2. The micro inverter according to claim 1, wherein the energy storage buffer circuit further comprises:

a switch unit configured by the controller to be in either a forward conduction state or a reverse conduction state; and an energy storage element, and the second secondary-side winding is connected to the energy storage element by using the switch unit; and when the switch unit is in the forward conduction state, the energy storage element is configured to absorb the energy from the first power conversion circuit by using the transformer; and when the switch unit is in the reverse conduction state, the energy storage element is configured to transfer the energy to the second power conversion circuit by using the transformer.

3. The micro inverter according to claim 2, wherein the switch unit further comprises the pair of transistors as a first switch and a second switch; and the energy storage element is configured to absorb the energy from the first power conversion circuit by using the transformer; and transfer the energy to the second power conversion circuit by using the transformer.

4. The micro inverter according to claim 1, further comprising:

a first impedance element, wherein the output of the first power conversion circuit is connected in series to the first impedance element and then connected to the primary-side winding.

5. The micro inverter according to claim 4, further comprising:

a second impedance element, wherein the first secondary-side winding is connected in series to the second impedance element and then connected to the input of the second power conversion circuit.

6. The micro inverter according to claim 1, wherein the micro inverter is a direct current/alternating current (DC)/(AC) converter, the first power conversion circuit is a DC/AC conversion circuit, and the second power conversion circuit is an AC/AC conversion circuit.

7. The micro inverter according to claim 3, wherein:

a first terminal of the second secondary-side winding is connected to a first end of the energy storage element, a second terminal of the second secondary-side winding is connected to a drain of the first switch, a source of the first switch is connected to a source of the second switch, and a drain of the second switch is connected to a second end of the energy storage element.

8. The micro inverter according to claim 7, wherein:

the first terminal of the second secondary-side winding is connected to the first end of the energy storage element by using the first switch, and the second terminal of the second secondary-side winding is connected to the second end of the energy storage element by using the second switch.

9. The micro inverter of claim 1, further comprising:

a first impedance element, wherein the output of the first power conversion circuit is connected in parallel to the first impedance element and then connected to the primary-side winding.

10. The micro inverter of claim 9, further comprising:

a second impedance element, wherein the first secondary-side winding is connected in parallel to the second impedance element and further connected to the input of the second power conversion circuit.

11. The micro inverter of claim 3, wherein:

a first terminal of the second secondary-side winding is connected to a first end of the energy storage element, a second terminal of the second secondary-side winding is connected to a source of the first switch, a drain of the first switch is connected to a drain of the second switch, and a source of the second switch is connected to a second end of the energy storage element.

12. The micro inverter of claim 1, wherein the pair of transistors are two transistors of a common-source structure.

13. The micro inverter of claim 1, wherein the pair of transistors are two transistors of a common-drain structure.

14. The micro inverter of claim 1, wherein the pair of transistors are metal-oxide-semiconductor field-effect transistors (MOSFETs).

15. The micro inverter of claim 1, wherein the pair of transistors are made of GaN.

* * * * *